Feb. 6, 1951        J. S. NEALE        2,540,404
MULTIROTOR HELICOPTER
Filed April 19, 1949
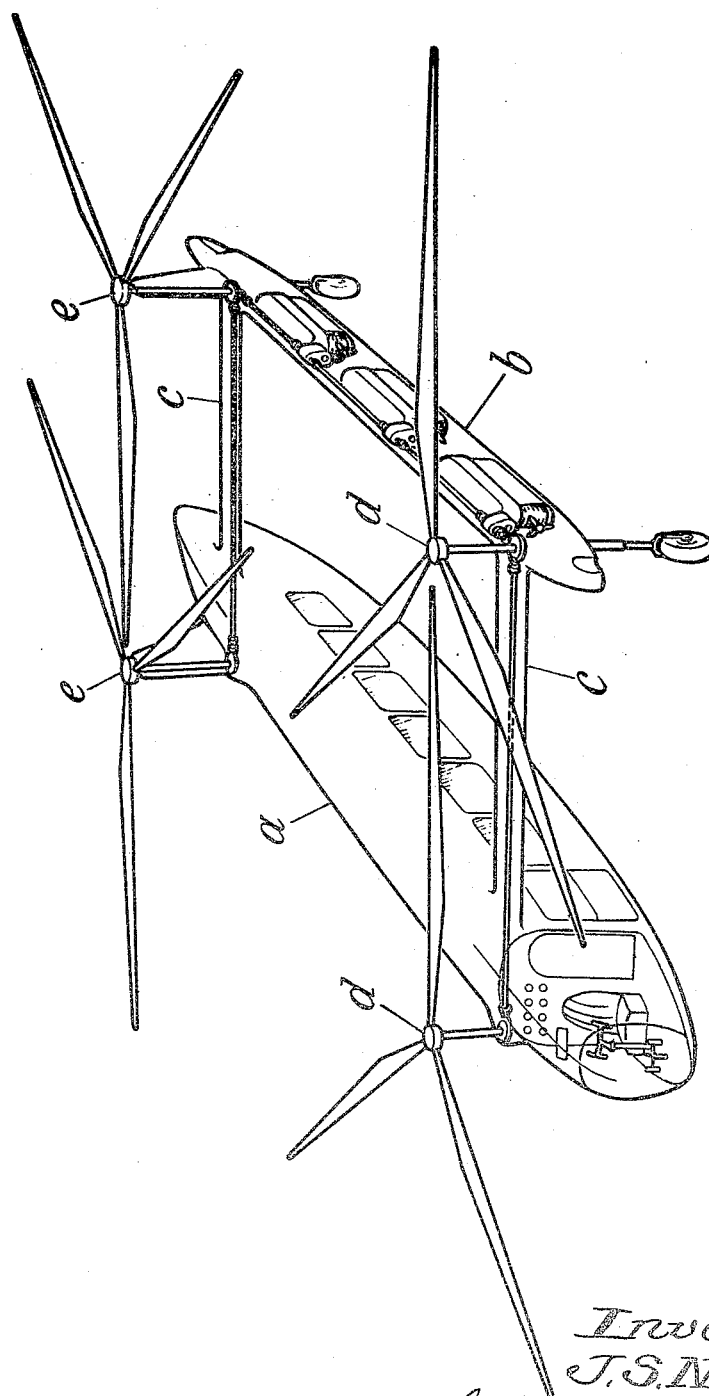
Inventor
J. S. Neale Patented Feb. 6, 1951

2,540,404

UNITED STATES PATENT OFFICE 2,540,404

MULTIROTOR HELICOPTER

John Sidney Neale, Hendon, London, England, assignor to Pennine Aircraft Limited, Manchester, England, a British company Application April 19, 1949, Serial No. 88,303
In Great Britain January 4, 1949

1 Claim. (Cl. 244—17.11)

This invention relates to multi-rotor helicopters, and has for its object to provide a machine having improved operating characteristics.

The helicopter according to the invention has four rotors of substantially equal diameters located at the four corners of a rectangle, the length of the shorter sides of the rectangle, which are substantially at right angles to the normal direction of flight, being about $6/10$ of the rotor diameter and the length of the long sides being about $9/10$ of the rotor diameter, a fuselage extending along one of the long sides of the rectangle, but offset inwardly with respect thereto, and a compartment of smaller cross-sectional area than the fuselage extending along the other long side, such structures being connected together by suitable beams or braces, all being arranged to provide broadly symmetrical lift and drag components about the four rotor systems.

The fuselage accommodates passengers and cargo, while the engines and fuel tanks are disposed in the other compartment.

Preferably means are provided for automatically reducing the pitch of the retreating blades relative to that required to equalise lift reactions at all blade roots during translation, the retreating blades being on the inward side of each rotor. Such means may comprise a cyclic pitch change system as described and claimed in application No. 88,302, filed April 19, 1949, or other known means such as a swash plate or a hinged blade system may be used.

Any desired number and type of power units may be employed.

The accompanying explanatory drawing shows by way of example a perspective view of a helicopter in accordance with the invention.

The helicopter illustrated has a stream-lined fuselage $a$ with passenger and cargo accommodation, and with pilots' seat in the nose, and a stream-lined compartment $b$ for power units and fuel tanks, which is of less cross-sectional area than the fuselage $a$. The fuselage and compartment $b$ are connected by beams $c$.

Four rotors $d$, $e$ all of the same diameter are arranged at the corners of a rectangle, with one long side extending along the compartment $b$ and the other along the fuselage, which is offset inwardly, the rotors being mounted outside the centre line of the fuselage. The normal direction of flight is parallel to the long sides of the rectangle. The length of each long side of the rectangle is approximately $9/10$ of the rotor diameter, while the length of each short side is about $6/10$ of the rotor diameter, so that the two forward rotors $d$ overlap and intermesh, as do the two rear rotors $e$. The front rotors on one side of the machine rotate in the opposite direction, to those on the other side, the blades on the inward side of each rotor being the retreating blades.

With the arrangement according to the invention, the lift and drag forces can be distributed symmetrically on account of the offsetting of the fuselage. The use of over-lapping rotors, in conjunction with a pitch reducing system, allows of improved rotor efficiency with high maximum speeds. The passengers are isolated from the power unit and fuel tanks, and comfort and safety are thereby enhanced. The machine is particularly suited to easy maintenance.

What I claim is:

A helicopter, having rectangularly arranged structural elements comprising a fuselage, a nacelle of smaller cross sectional area than the fuselage and transverse connector elements, and having four rotors of substantially equal fixed diameters, two located above the nacelle and two located above the fuselage and outside the centre line thereof, the distance between a line through the centres of the rotors above the nacelle and a line through the centres of the rotors above the fuselage being about $6/10$ of the rotor diameter, and the distance between a line through the centres of the two rotors at one end of the helicopter and a line through the centres of the other two rotors being about $9/10$ of the rotor diameter.

JOHN SIDNEY NEALE.

REFERENCES CITED

The following references are of record in the file of this patent:

UNITED STATES PATENTS

| Number | Name | Date |
|---|---|---|
| 2,344,967 | Bennett | Mar. 28, 1944 |
| 2,375,592 | Smith | May 8, 1945 |

FOREIGN PATENTS

| Number | Country | Date |
|---|---|---|
| 391,110 | France | Aug. 20, 1908 |